(12) United States Patent
Park et al.

(10) Patent No.: US 10,076,900 B2
(45) Date of Patent: Sep. 18, 2018

(54) PEELING BAR FOR PEELING POLARIZING FILM FROM PANEL, PEELING APPARATUS AND PEELING METHOD USING THE SAME

(71) Applicant: LG CHEM, LTD., Seoul (KR)

(72) Inventors: San Park, Daejeon (KR); Bong su Jeung, Daejeon (KR); Jea han Ryoo, Daejeon (KR); Cheon ho Park, Daejeon (KR); Sukjae Lee, Daejeon (KR); Kyoung sik Kim, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 15/117,423

(22) PCT Filed: Mar. 17, 2015

(86) PCT No.: PCT/KR2015/002581
§ 371 (c)(1),
(2) Date: Aug. 8, 2016

(87) PCT Pub. No.: WO2016/024684
PCT Pub. Date: Feb. 18, 2016

(65) Prior Publication Data
US 2017/0028702 A1    Feb. 2, 2017

(30) Foreign Application Priority Data

Aug. 14, 2014 (KR) .......... 10-2014-0106316
Oct. 21, 2014 (KR) .......... 10-2014-0142931

(51) Int. Cl.
*B32B 43/00* (2006.01)
*B65H 41/00* (2006.01)
(Continued)

(52) U.S. Cl.
CPC .......... *B32B 43/006* (2013.01); *B65H 29/54* (2013.01); *B65H 41/00* (2013.01); *B32B 37/003* (2013.01);
(Continued)

(58) Field of Classification Search
CPC .......... B65H 29/54; B65H 2301/51122; Y10T 156/1132; Y10T 156/1174;
(Continued)

(56) References Cited

U.S. PATENT DOCUMENTS 3,064,713 A    11/1962   Bearer
4,549,416 A *  10/1985   Repetto ............... C14B 1/18
                                                    69/10

(Continued)

FOREIGN PATENT DOCUMENTS

CN    1532900      9/2004
CN    101234549    10/2007
(Continued)

OTHER PUBLICATIONS

Office Action of the U.S. Patent Office in U.S. Appl. No. 15/320,140, dated Apr. 3, 2017.
(Continued)

*Primary Examiner* — Mark A Osele
(74) *Attorney, Agent, or Firm* — Dentons US LLP

(57) ABSTRACT

The present invention relates to a peeling bar, apparatus, and method for peeling a polarizing film from a panel. This invention can minimize friction between the peeling bar and the polarizing film since the peeled polarizing film is in contact with a roller of the peeling bar. The radius of the roller of the peeling bar and the inclined surface of the fixing unit are designed to minimize the Z-axis component of a shearing force applied to the polarizing film. Also, in order to equalize tension applied to the polarizing film in a peeling
(Continued)

process, this invention makes both ends of the polarizing film closely adhere to the peeling bar.

According to this invention, fracture of the polarizing film is prevented, and thereby the polarizing film can be stably peeled from the panel without fracture.

17 Claims, 12 Drawing Sheets

(51) Int. Cl.
    *B65H 29/54*     (2006.01)
    *B32B 37/00*     (2006.01)

(52) U.S. Cl.
    CPC ....... *B32B 2307/42* (2013.01); *B32B 2457/20* (2013.01); *B65H 2301/51122* (2013.01); *B65H 2801/61* (2013.01); *Y10S 156/93* (2013.01); *Y10S 156/941* (2013.01); *Y10T 156/1174* (2015.01); *Y10T 156/195* (2015.01); *Y10T 156/1978* (2015.01)

(58) Field of Classification Search
    CPC ........... Y10T 156/1944; Y10T 156/195; Y10T 156/1978; B32B 43/006; Y10S 156/93; Y10S 156/941
    See application file for complete search history.

(56) References Cited

U.S. PATENT DOCUMENTS

| | | | |
|---|---|---|---|
| 4,685,991 | A | 8/1987 | Herrmann et al. |
| 5,282,918 | A | 2/1994 | Heist et al. |
| 5,891,297 | A | 4/1999 | Stadtmueller |
| 6,227,276 | B1* | 5/2001 | Kim ................... B29C 63/0013 156/714 |
| 7,413,626 | B2 | 8/2008 | Anderson et al. |
| 7,655,109 | B2 | 2/2010 | Manners |
| 7,763,141 | B2 | 7/2010 | Yamamoto |
| 8,038,824 | B2* | 10/2011 | Kobayashi ........ H01L 21/67132 156/247 |
| 8,110,069 | B2* | 2/2012 | Garben ................... B41J 29/38 156/715 |
| 8,137,417 | B2* | 3/2012 | Eguchi ................. B32B 43/006 257/E21.6 |
| 8,141,611 | B2 | 3/2012 | Lai et al. |
| 8,142,610 | B2 | 3/2012 | Tani et al. |
| 8,833,423 | B2 | 9/2014 | Chida et al. |
| 9,283,742 | B2 | 3/2016 | He |
| 2001/0017189 | A1 | 8/2001 | Tsujimoto et al. |
| 2004/0050489 | A1 | 3/2004 | Ohwada et al. |
| 2005/0019980 | A1 | 1/2005 | Kurosawa et al. |
| 2005/0221739 | A1 | 10/2005 | Hoffman et al. |
| 2006/0000550 | A1 | 1/2006 | Yao et al. |
| 2007/0284028 | A1 | 12/2007 | Kawashima et al. |
| 2008/0132033 | A1* | 6/2008 | Eguchi .............. H01L 21/67092 438/460 |
| 2008/0185100 | A1 | 8/2008 | Jang et al. |
| 2008/0236743 | A1* | 10/2008 | Kye ................... B29C 63/0013 156/714 |
| 2008/0245483 | A1* | 10/2008 | Toyoshima ........... B32B 43/006 156/763 |
| 2009/0017737 | A1 | 1/2009 | Hesse |
| 2009/0128904 | A1 | 5/2009 | Uejima et al. |
| 2010/0181019 | A1 | 7/2010 | Kino et al. |
| 2011/0155328 | A1 | 6/2011 | Kobayashi et al. |
| 2012/0218503 | A1 | 8/2012 | Tsai et al. |
| 2013/0126100 | A1 | 5/2013 | Fujita |
| 2014/0014701 | A1 | 1/2014 | Lu et al. |
| 2014/0076501 | A1 | 3/2014 | Kim et al. |
| 2014/0102270 | A1 | 4/2014 | Teck |
| 2014/0139919 | A1 | 5/2014 | Goto et al. |
| 2016/0023449 | A1* | 1/2016 | Sun ..................... B32B 37/0053 156/701 |
| 2016/0207732 | A1* | 7/2016 | Park ....................... B65H 41/00 |

FOREIGN PATENT DOCUMENTS

| | | | | |
|---|---|---|---|---|
| CN | 101185013 | | 5/2008 | |
| CN | 103608718 | | 6/2012 | |
| CN | 103193010 | A | 1/2013 | |
| CN | 103158327 | | 6/2013 | |
| CN | 103158327 | A | 6/2013 | |
| CN | 103193010 | | 7/2013 | |
| CN | 103823268 | | 11/2013 | |
| CN | 103959145 | | 7/2014 | |
| CN | 104460099 | | 9/2014 | |
| CN | 204203585 | | 3/2015 | |
| JP | 09133367 | A * | 5/1997 | .......... H05B 1/0266 |
| JP | 11145225 | A * | 5/1999 | |
| JP | 2003335454 | A | 11/2003 | |
| JP | 2004001959 | | 1/2004 | |
| JP | 2004170545 | | 6/2004 | |
| JP | 2007-071975 | A | 3/2007 | |
| JP | 2007071975 | | 3/2007 | |
| JP | 2009-288417 | A | 12/2009 | |
| JP | 2012-242607 | A | 12/2012 | |
| JP | 2013135053 | | 7/2013 | |
| KR | 1020080071337 | A | 8/2008 | |
| KR | 1020080072183 | A | 8/2008 | |
| KR | 10-2013-0056800 | | 5/2013 | |
| KR | 10-1277325 | | 6/2013 | |
| KR | 1020140034837 | A | 3/2014 | |
| KR | 1020140086391 | A | 7/2014 | |
| TW | M293451 | | 7/2006 | |
| TW | 200736147 | | 10/2007 | |
| TW | 200844547 | | 11/2008 | |
| TW | 201043560 | | 12/2010 | |
| TW | 201119864 | | 6/2011 | |
| TW | 201200944 | | 1/2012 | |
| TW | 201350416 | | 12/2013 | |
| WO | 2008023501 | | 2/2008 | |
| WO | 2013/118290 | A1 | 8/2013 | |

OTHER PUBLICATIONS

Office Action of the U.S. Patent Office in U.S. Appl. No. 14/782,106, dated Nov. 15, 2016.

* cited by examiner

| Tip diameter (mm) | Peeling load (N/mm) | Max.stress (MPa) | Peeling surface stress (MPa) |
|---|---|---|---|
| 3 mm | 16.35 | 152.6 | 152.6 |
| 4 mm | 16.35 | 158.8 | 158.8 |
| 5 mm | 16.35 | 171.5 | 171.5 |
| 3 mm | 9.81 | 340.4 | 340.4 |
| 4 mm | 9.81 | 358.4 | 358.4 |
| 5 mm | 9.81 | 373.9 | 373.9 |

| Tip diameter (mm) | Peeling load (N/mm) | Max.stress (MPa) | Peeling surface stress (MPa) |
|---|---|---|---|
| 5 mm | 16.35 | 202.7 (Occur at tip) | 151.2 |
| 10 mm | 16.35 | 152.6 | 152.6 |
| 15 mm | 16.35 | 239.4 | 239.4 |
| 5 mm | 9.81 | 197.0 | 197.0 |
| 10 mm | 9.81 | 340.4 | 340.4 |
| 15 mm | 9.81 | 407.0 | 407.0 |

|  | Peeling load (N/mm) | Max.stress (MPa) |
|---|---|---|
| Case #1 | 3.27 | 437.1 |
| Case #2 | 6.54 | 411.6 |
| Case #3 | 9.81 | 340.4 |
| Case #4 | 13.08 | 211.3 |
| Case #5 | 16.35 | 152.6 |

(a)

(b)

PEELING BAR FOR PEELING POLARIZING FILM FROM PANEL, PEELING APPARATUS AND PEELING METHOD USING THE SAME

This application is a National Stage Application of International Application No. PCT/KR2015/002581, filed Mar. 17, 2015, and claims the benefit of Korean Patent Application No. 10-2014-0142931, filed Oct. 21, 2014, and Korean Patent Application No. 10-2014-0106316, filed Aug. 14, 2014, the contents of which are incorporated herein by reference in their entirety for all purposes as if fully set forth below.

TECHNICAL FIELD

The present invention relates to technology of peeling a polarizing film from a panel and, more particularly, to a peeling bar, a peeling apparatus, and a peeling method for preventing the fracture of the polarizing film when peeling the polarizing film attached to the panel.

BACKGROUND ART

Normally a polarizing film is attached to a panel of an image display device and produces polarized light that vibrates in a specific direction and displays an image. Sometimes there may be bubble or any other foreign matter between the panel and the polarizing film. In this case, the polarizing film should be peeled from the panel by using a peeling apparatus.

However, when the polarizing film is peeled from the panel, certain irregular tension applied to the polarizing film may cause the fracture of the polarizing film. This fracture needs additional manual labor which is quite cumbersome and also increases the entire time of a peeling process. Additionally, when such fracture occurs, adhesive used for attachment between the polarizing film and the panel often invites unclean surroundings.

DISCLOSURE

Technical Problem

The object of the present invention is to provide a peeling bar, a peeling apparatus, and a peeling method for stably peeling a polarizing film so that a reduced frictional force is applied to the polarizing film when the polarizing film is peeled from a panel, and also so that tension is uniformly applied to the polarizing film by preventing stress concentration at the polarizing film during a peeling process.

Technical Solution

In order to accomplish the aforesaid object, according to an embodiment of the present invention, a peeling bar for peeling a polarizing film from a panel includes a guide unit, a fixing unit, and a roller. The fixing unit is combined with a front part of the guide unit. The roller is installed rotatably on the fixing unit and is configured to prevent fracture of the polarizing film being peeled.

According to an embodiment of this invention, the peeling bar may further include a magnetic unit, which is mounted apart from the roller and is configured to prevent a rotation axis of the roller from sagging.

According to an embodiment of this invention, in the peeling bar, a radius of the roller may range from 4 mm to 30 mm, preferably, 5 mm.

According to an embodiment of this invention, in the peeling bar, the fixing unit may include an inclined surface configured to connect an upper part of the roller with the guide unit. An inclined angle of the inclined surface may range from 20 degrees to 40 degrees, preferable, 30 degrees.

According to an embodiment of this invention, in the peeling bar, the roller may be combined with the fixing unit through a bearing and a washer.

According to an embodiment of this invention, a peeling apparatus for peeling a polarizing film from a panel includes a stage, a clamper, a peeling bar, and a controller. The stage is configured to place thereon the panel having the polarizing film attached thereto. The clamper is configured to clamp a part of the polarizing film peeled from the panel. The peeling bar is configured to be moved on the polarizing film to prevent the polarizing film from being bent steeply when the polarizing film is peeled from the panel. The controller is configured to move at least one of the stage and the clamper to peel the polarizing film such that tension is uniformly applied to the polarizing film by preventing stress concentration at a peeling position of the polarizing film.

According to an embodiment of this invention, in the peeling apparatus, the controller may be further configured to rotate at least one of the stage, the peeling bar and the clamper and thereby to make both ends of the polarizing film closely adhere to the peeling bar such that tension is applied uniformly to the polarizing film at the peeling position.

According to an embodiment of this invention, in the peeling apparatus, the stage may be installed to be freely rotated by an external force. Therefore, the stage may be rotated by tension applied to the polarizing film, and thereby both ends of the polarizing film can closely adhere to the peeling bar such that tension is applied uniformly to the polarizing film at the peeling position. In this case, the controller performs a control for moving the stage linearly or moving the clamper without performing a control for rotating the stage.

According to an embodiment of this invention, in the peeling apparatus, the controller may be further configured to move at least one of the stage and the clamper and thereby to make both ends of the polarizing film closely adhere to the peeling bar such that tension is applied uniformly to the polarizing film at the peeling position.

According to an embodiment of this invention, the peeling apparatus may further include an accelerant spray unit, which is configured to spray a peeling accelerant to the peeling position. The stage may include an accelerant storage configured to prevent the peeling accelerant from seeping.

According to an embodiment of this invention, in the peeling apparatus, the stage may include a plurality of flat-type heaters, which are configured to apply heat uniformly to an entire surface thereof.

According to an embodiment of this invention, in the peeling apparatus, the peeling bar may be adjustable in height. Also, a gap between the peeling bar and the panel may be adjustable.

According to an embodiment of this invention, in the peeling apparatus, the clamper may be configured to adjust a peeling load applied to the polarizing film in a peeling process.

According to an embodiment of this invention, a peeling method for peeling a polarizing film from a panel includes a placing step, a fixing step, and a peeling step. In the placing step, the panel having the polarizing film attached thereto is placed on a stage. In the fixing step, a part of the polarizing film is fixed to a clamper after the part of the polarizing film is peeled from the panel, wherein a peeling bar is located at a peeling position, and wherein the peeled polarizing film is in contact with a roller of the peeling bar. In the peeling step, the polarizing film is peeled by moving at least one of the clamper and the stage, wherein the polarizing film being in contact with the roller of the peeling bar is prevented from being bent steeply.

According to an embodiment of this invention, in the peeling method, the peeling step may include rotating at least one of the stage, the peeling bar and the clamper, and thereby making both ends of the polarizing film closely adhere to the peeling bar such that tension is applied uniformly to the polarizing film at the peeling position.

According to an embodiment of this invention, in the peeling method, the peeling step may include, when the stage is installed to be freely rotated by an external force, allowing the stage to be rotated by tension applied to the polarizing film, and thereby allowing both ends of the polarizing film to closely adhere to the peeling bar such that tension is applied uniformly to the polarizing film at the peeling position.

According to an embodiment of this invention, in the peeling method, the peeling step may include moving at least one of the stage and the clamper, and thereby making both ends of the polarizing film closely adhere to the peeling bar such that tension is applied uniformly to the polarizing film at the peeling position.

According to an embodiment of this invention, in the peeling method, the peeling step may include spraying a peeling accelerant to the peeling position.

According to an embodiment of this invention, in the peeling method, at least one of the fixing step and the peeling step may include applying heat to the panel through a plurality of flat-type heaters installed to apply heat uniformly to an entire surface of the stage.

Advantageous Effects

According to the present invention, since the polarizing film being peeled is in contact with the roller of the peeling bar, a frictional force applied to the polarizing film can be minimized and thus the fracture of the polarizing film can be prevented. Additionally, the radius of the roller of the peeling bar and the inclined surface of the fixing unit are designed to minimize the Z-axis component of a shearing force applied to the polarizing film, so that the fracture of the polarizing film can be prevented in a peeling process.

Further, the present invention rotates at least one of the stage, the peeling bar and the clamper or transfers at least one of the stage and the clamper by considering tension applied to the polarizing film in a peeling process, so that tension can be uniformly applied to the polarizing film. Therefore, both ends of the polarizing film are very close to the peeling bar at a peeling position in a peeling process, so that the polarizing film can be stably peeled without fracture.

MODE FOR INVENTION

Hereinafter, the present invention will be described with reference to the accompanying drawings. However, well known or widely used techniques, elements, structures, and processes may not be described or illustrated in detail to avoid obscuring the essence of the present invention.

The terms and words used in the following description and claims are not limited to the bibliographical meanings, but are merely used by the inventor to enable a clear and consistent understanding of the present invention. Accordingly, it should be apparent to those skilled in the art that the following description of various embodiments of the present invention is provided for illustration purpose only and not for the purpose of limiting the present invention as defined by the appended claims and their equivalents.

Figure 1:
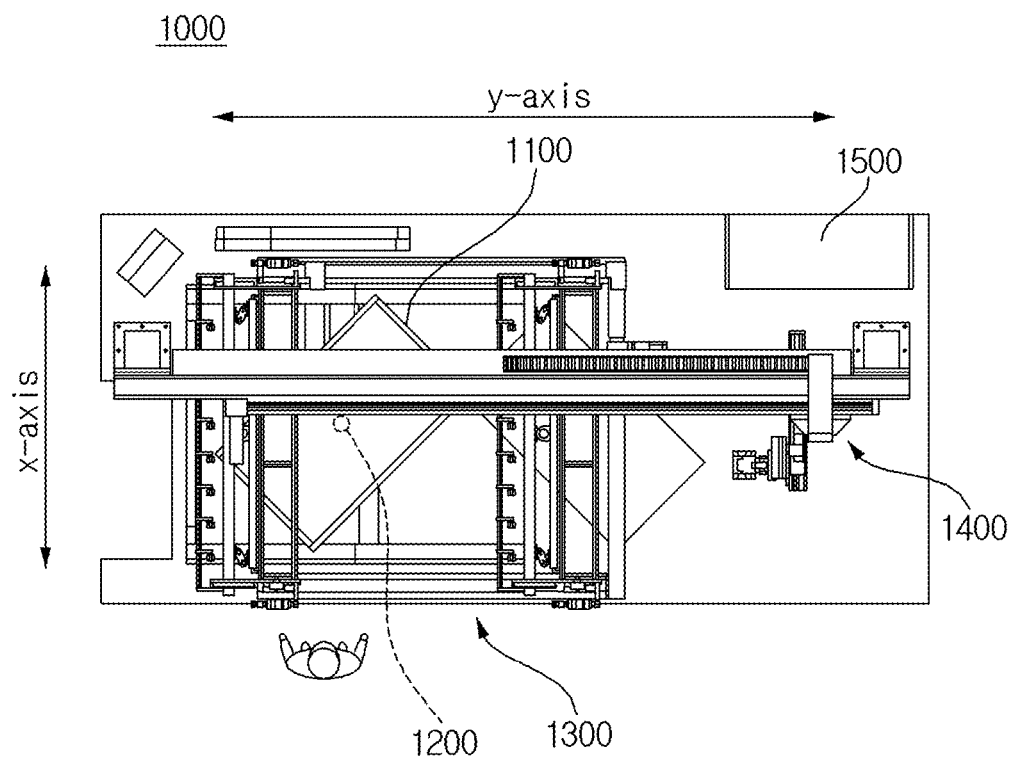
FIG. 1 is a plan view of an apparatus for peeling a polarizing film from a panel in accordance with an embodiment of the present invention.
Figure 2:
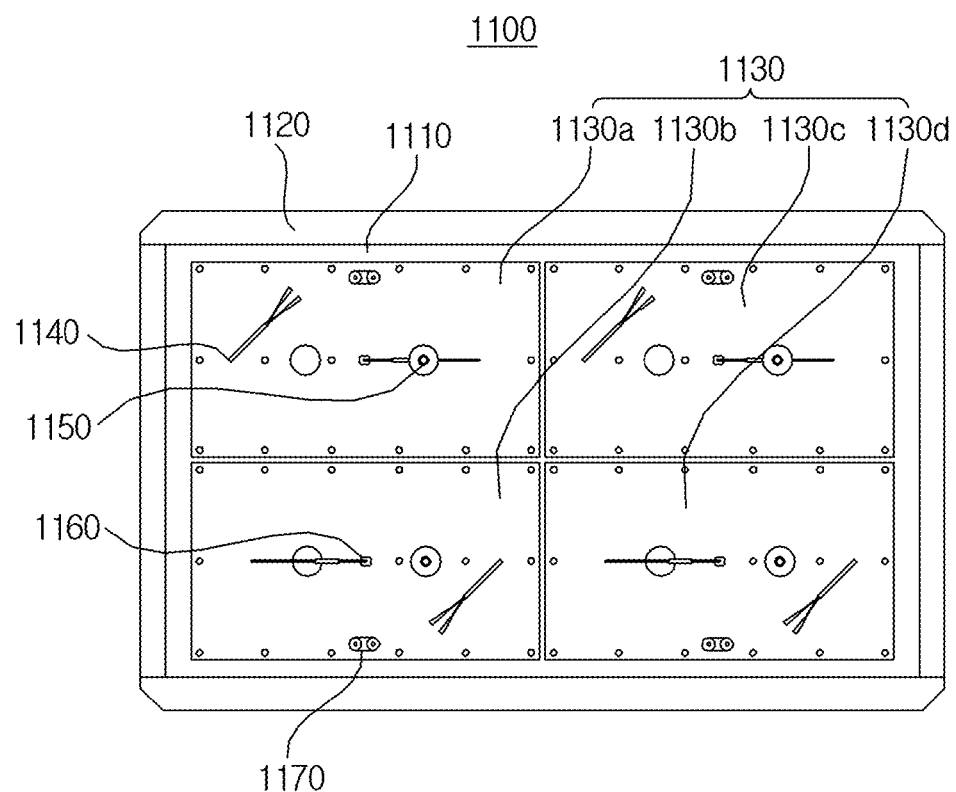
FIG. 2 is a plan view illustrating a stage of a peeling apparatus in accordance with an embodiment of the present invention.
Figure 3:
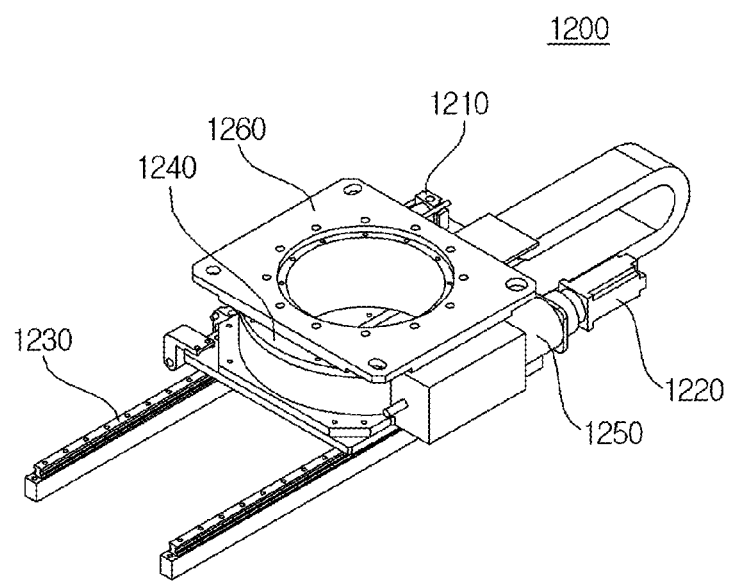
FIG. 3 is a perspective view illustrating a stage conveying assembly in accordance with an embodiment of the present invention.
Figure 4:
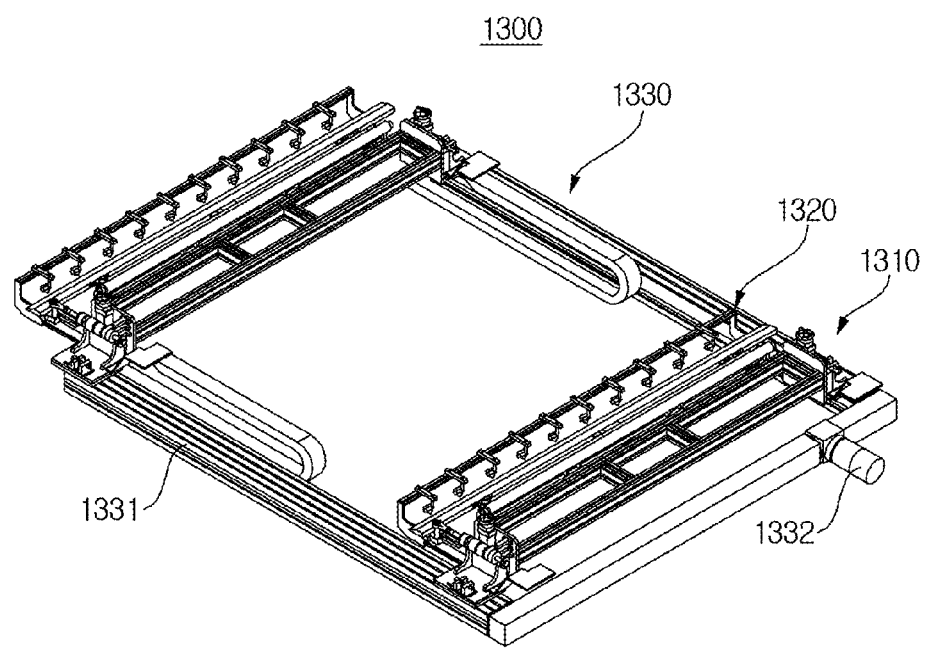
FIG. 4 is a perspective view illustrating a peeling assembly of a peeling apparatus in accordance with an embodiment of the present invention.
Figure 5:
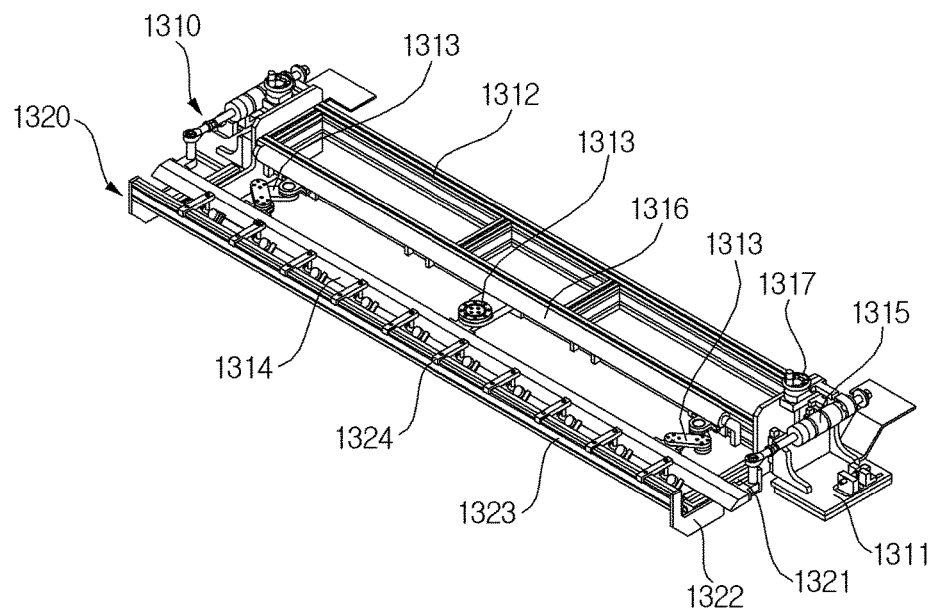
FIG. 5 is a perspective view illustrating a peeling unit and an accelerant spray unit of a peeling assembly in accordance with an embodiment of the present invention.
Figure 6:
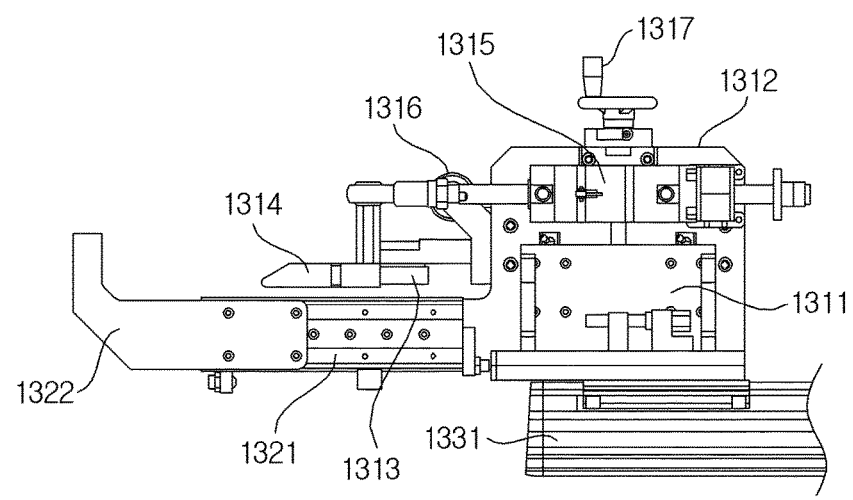
FIG. 6 is a side view illustrating a peeling unit of a peeling assembly in accordance with an embodiment of the present invention.

FIG. 1 is a plan view of an apparatus for peeling a polarizing film from a panel in accordance with an embodiment of the present invention, FIG. 2 is a plan view illustrating a stage of a peeling apparatus in accordance with an embodiment of the present invention, and FIG. 3 is a perspective view illustrating a stage conveying assembly in accordance with an embodiment of the present invention. Additionally, FIG. 4 is a perspective view illustrating a peeling assembly of a peeling apparatus in accordance with an embodiment of the present invention, FIG. 5 is a perspective view illustrating a peeling unit and an accelerant spray unit of a peeling assembly in accordance with an embodiment of the present invention, and FIG. 6 is a side view illustrating a peeling unit of a peeling assembly in accordance with an embodiment of the present invention.

As shown in FIG. 1, a peeling apparatus 1000 for peeling a polarizing film from a panel includes a stage 1100, a stage conveying assembly 1200, a peeling assembly 1300, a clamping assembly 1400, and a controller 1500.

A panel to which a polarizing film is attached is mounted on the stage 1100. The stage conveying assembly 1200 is located under the stage 1100 and configured to rotate or convey the stage 1100. The peeling assembly 1300 is configured to peel the polarizing film from the panel, allowing a stable peeling without the fracture of the polarizing film. The clamping assembly 1400 is configured to clamp parts of the peeled polarizing film. The controller 1500 controls the stage 1100, the stage conveying assembly 1200, the peeling assembly 1300, and the clamping assembly 1400 in order to peel the polarizing film from the panel.

Hereinafter, for comprehension, let's suppose that a side-to-side (horizontal) direction and an up-and-down (vertical) direction in a plan view shown in FIG. 1 are the Y-axis direction or lengthwise direction and the X-axis direction or widthwise direction, respectively. Now, each element of the peeling apparatus according to an embodiment of the present invention will be described in detail.

As shown in FIG. 2, the stage 1100 according to an embodiment of this invention includes a flat-type mounting area 1110 and an accelerant storage 1120 located at the edge of the mounting area 1110. The panel to which the polarizing film is attached is mounted on the mounting area 1110. When the polarizing film is peeled from the panel on the mounting area 1110, a peeling accelerant may be sprayed to assist peeling. The accelerant storage 1120 prevents the peeling accelerant from seeping into the peeling apparatus 1000.

Meanwhile, the mounting area 1110 may have a plurality of flat-type heaters 1130. These heaters 1130 apply heat to a peeling target (i.e., the panel having the attached polarizing film) and reduce the adhesive strength of adhesive. In this embodiment, the mounting area 1110 is heated uniformly through the plurality of heaters 1130 and can transfer heat uniformly to the peeling target mounted thereon. Therefore, the adhesive may also be heated uniformly, so that any fracture of the polarizing film due to partially residual adhesive can be prevented. Although the heaters 1130 are formed of four flat-type heaters 1130a, 1130b, 1130c and 1130d in this embodiment, this is exemplary only and not construed as a limitation.

Disposed at each heater 1130 are a superheat sensor 1140 for detecting an excessive heat more than a predetermined temperature, a supporting axis 1150 for supporting the heater 1130, a temperature sensor 1160 for measuring a temperature of the stage 1100, and a heater power supplier 1170 for supplying electric power to each heater 1130.

The stage conveying assembly 1200 is located under the stage 1100 and configured to convey the stage 1100. As shown in FIG. 3, the stage conveying assembly 1200 includes servo motors 1210 and 1220, a linear motion guide 1230, a servo cam driver 1240, a reducer 1250, and a supporting plate 1260. The servo motors 1210 and 1220 offer driving power for a rotary motion or linear motion of the stage conveying assembly 1200. The linear motion guide 1230 guides a linear motion of the stage conveying assembly 1200. The servo cam driver 1240 receives driving power from the servo motors 1210 and 1220 and then offers rotary power for rotating the stage 1100. The reducer 1250 may be used for a reliable connection between the servo motors 1210 and 1220 and the servo cam driver 1240. The supporting plate 1260 is connected with a lower portion of the stage 1100, supports the stage 1100, and delivers rotary power of the servo cam driver 1250 to the stage 1100.

The peeling assembly 1300 is configured to peel the polarizing film from the panel, allowing a stable peeling without the fracture of the polarizing film. As shown in FIGS. 4 to 6, the peeling assembly 1300 includes a peeling unit 1310, an accelerant spray unit 1320, and a peeling transfer unit 1330.

The peeling unit 1310 includes a moving member 1311, a base frame 1312, a joint member 1313, a peeling bar 1314, a low-frictional cylinder 1315, a rotating bar 1316, and a height adjusting handle 1317. The moving member 1311 is an L-shaped member. In this embodiment, two moving members 1311 are used such that inner side surfaces thereof face each other and lower surfaces thereof are installed on a guide rail 1321. Therefore, the moving members 1311 allow the peeling unit 1310 to move along the guide rail 1321. The base frame 1312 is installed between the inner side surfaces of the moving members 1311. The base frame 1312 and the moving members 1311 are connected with and supported by each other. The joint member 1313 is formed at one side of the base frame 1312 in a lengthwise direction. The joint member 1313 connects the base frame 1312 and the peeling bar 1314. The peeling bar 1314 is extended in a widthwise and has an inclined upper surface. Both ends of the peeling bar 1314 are connected with the low-frictional cylinder 1315. Using the low-frictional cylinder 1315 and the joint member 1313, the peeling member 1314 can be rotated to a certain degree on the Z-axis. A rotation sensor (not shown) for detecting the rotation of the peeling bar 1314 on the Z-axis of the joint member 1313 may be connected with the joint member 1313. The rotating bar 1316 is formed to be extended in a widthwise and spaced apart from the peeling bar 1314, being parallel with the peeling bar 1314. Specifically, the rotating bar 1316 is closer to the base frame 1312 than the peeling bar 1314 and also is located above the peeling bar 1314. The rotating bar 1316 can be rotated on the X-axis.

Figures 7, 8:
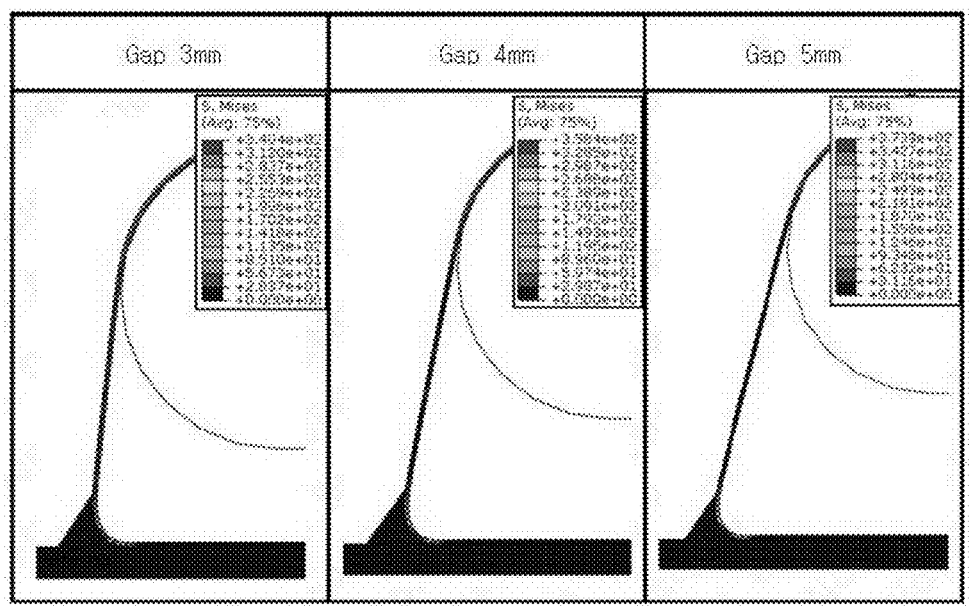
FIG. 7 is a table showing variations in stress of a peeling surface depending on a gap between a peeling bar and the peeling surface at the same peeling load.
FIG. 8 is a diagram showing results of analyzing variations in stress of a peeling surface depending on a gap between a peeling bar and the peeling surface in case a peeling load is 9.81 N/mm.

The height adjusting handle 1317 adjusts the height of the peeling unit 1310. When a gap between the peeling bar 1314 and a peeled position (i.e., a peeling surface) is smaller, less serious fracture is caused to the polarizing film being peeled. The reason is that a smaller distance from the peeling bar 1314 to the peeling surface increases a restoring force of the bent polarizing film and thus reduces stress. This result can be ascertained by experimental results shown in FIGS. 7 and 8. As shown in FIGS. 7 and 8, even though a peeling load is unchanged, a smaller gap between the peeling bar 1314 and the peeling surface can reduce stress applied to the peeling surface and thus decrease a damage of the polarizing film being peeled. However, since components for driving the screen are protruded from the panel, a gap between the peeling bar 1314 and the peeling surface may not be reduced unlimitedly. This embodiment keeps a narrow gap between the peeling bar 1314 and the peeling surface by adjusting the height of the peeling unit 1310 through the height adjusting handle 1317 and, if necessary, may widen the gap.

The accelerant spray unit 1320 includes a table cylinder 1321, a supporting member 1322, a supporting bar 1323, and a spray 1324. The table cylinder 1321 is connected with each of two moving members 1311 in a longitudinal direction. The supporting member 1322 is combined with the table cylinder 1321 in the form of being extended in a longitudinal direction. The supporting bar 1323 is connected between two supporting members 1322. A plurality of sprays 1324 are disposed on the supporting bar 1323 and spray peeling accelerant. In this embodiment, peeling accelerant may be water.

The peeling transfer unit 1330 transfers the peeling unit 1310 in the lengthwise direction (the Y-axis direction). For this, the peeling transfer unit 1330 may have a guide rail 1331 and a power provider 1332. The guide rail 1331 offers a guide for transferring the peeling unit 1310 in the lengthwise direction. The power provider 1332 offers a driving force for transferring the peeling unit 1310. In this embodiment, the power provider 1332 may include a meter box, a decelerator, and a servo motor.

The peeling bar 1314 of the peeling unit 1310 leads the polarizing film to be peeled stably without fracture when the polarizing film is peeled from the panel. For this, the peeling bar 1314 moves above a peeling position of the polarizing film such that the polarizing film may not be peeled steeply with the progress of a peeling process. The peeled polarizing film is in contact with the end part of the peeling bar 1314. At this time, in order to reduce friction between the polarizing film and the peeling bar 1314, the end part of the peeling bar 1314 takes a curved form. Meanwhile, the rotating bar 1316 rotates freely such that the peeled polarizing film can move freely.

Figure 9:
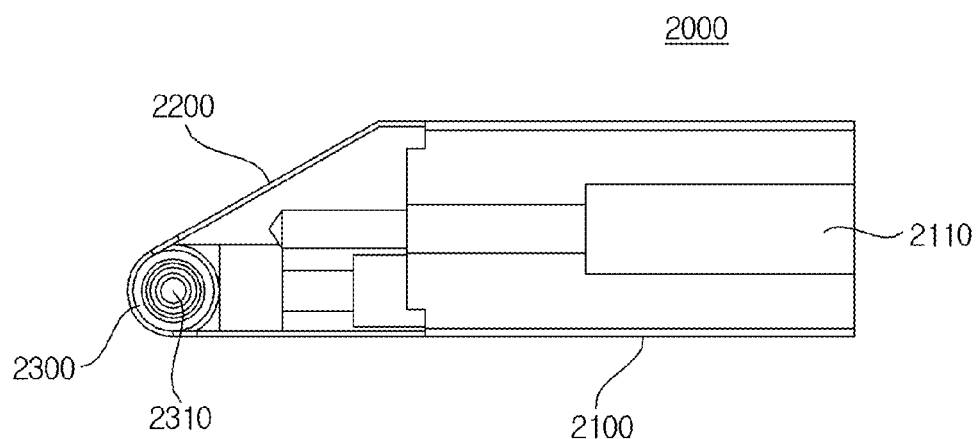
FIG. 9 is a side view illustrating a peeling bar equipped with a roller in accordance with an embodiment of the present invention.
Figure 10:
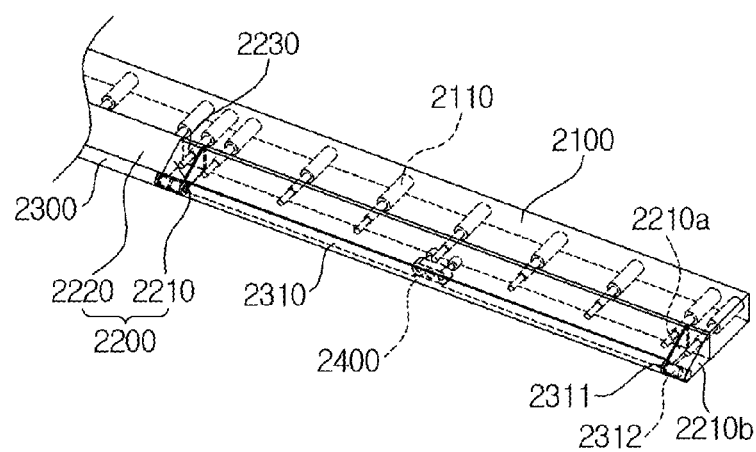
FIG. 10 is a perspective view illustrating a peeling bar equipped with a roller in accordance with an embodiment of the present invention.

Now, a detailed configuration of the peeling bar having a roller equipped at the end part in an embodiment of this invention will be described with reference to additional drawings. FIG. 9 is a side view illustrating a peeling bar equipped with a roller in accordance with an embodiment of the present invention. Also, FIG. 10 is a perspective view illustrating a peeling bar equipped with a roller in accordance with an embodiment of the present invention. And also, FIG. 11 is an enlarged view illustrating parts of a peeling bar equipped with a roller in accordance with an embodiment of the present invention.

Figures 11, 12:
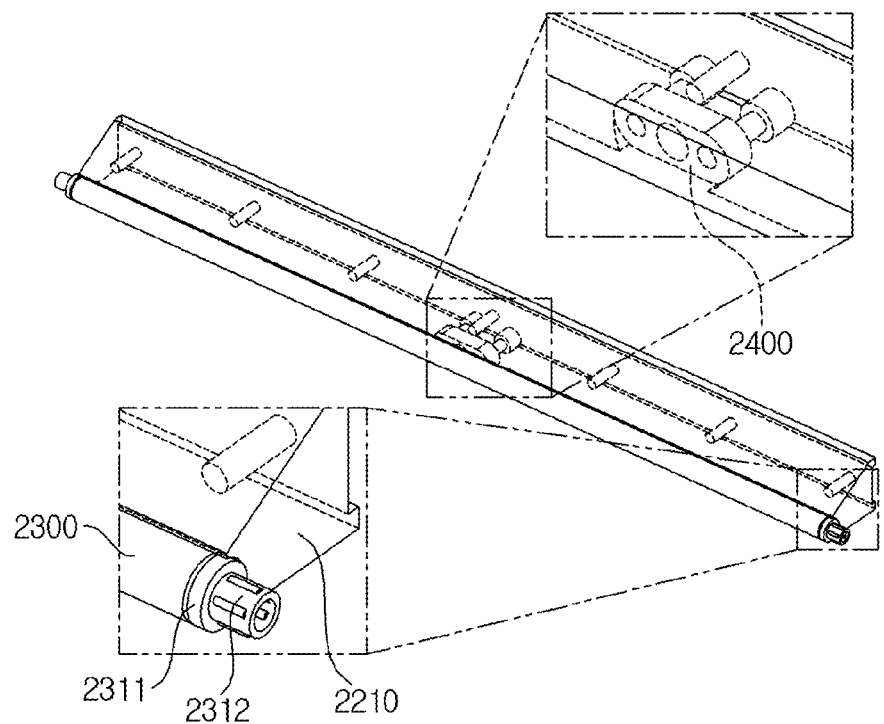
FIG. 11 is an enlarged view illustrating parts of a peeling bar equipped with a roller in accordance with an embodiment of the present invention.
FIG. 12 is a table showing variations in stress of a peeling surface depending on variations in diameter of a roller.

As shown in FIGS. 9 to 11, a peeling bar 2000 includes a guide unit 2100, a fixing unit 2200, and a roller 2300. The guide unit 2100 gives support to the peeling bar 2000 so as to prevent bending or sagging. The fixing unit 2200 is combined with the front part of the guide unit 2100. A coupling member 2110 may be used for a combination between the fixing unit 220 and the guide unit 2100. The fixing unit 2200 has both sidewalls 2210 and an inclined surface 2220. The inclined surface 2220 connects an upper part of the roller 2300 with the guide unit 2100. The roller 2300 is installed rotatably on the fixing unit 2200. In this embodiment, in order to prevent the sagging of the roller 2300, the peeling bar 2000 may have a plurality of rollers 2300, divided individually at a predetermined length, and a plurality of fixing units 2200 corresponding thereto. In a peeling process, the plurality of rollers 2300 can reduce friction between the polarizing film and the peeling bar 2000, thus preventing the fracture of the polarizing film.

Specifically, the roller 2300 is combined with the fixing unit 2200 through a rotation axis 2310. The rotation axis 2310 is located across both sidewalls 2210 of the fixing unit 2200 and combined with both sidewalls 2210 through a washer 2311 and a bearing 2312. For a stable combination of the bearing 2312, a bearing holder 2230 is formed between both sidewalls 2210a and 2210b of the adjacent fixing units 2200. Like the inclined surface 2220 of the fixing unit 2200, the bearing holder 2230 is inclined from the guide unit 2100 and has a curved surface at the end part thereof. In this embodiment, the fixing unit 2200, the bearing 2312 and the bearing holder 2230 may be formed of SUS for anti-corrosion. The washer 2311 may be formed of acetal resin.

A magnetic unit 2400 may be mounted inside the fixing unit 2200. The magnetic unit 2400 is located apart from the roller 2300 between the guide unit 2100 and the roller 2300 and prevents, by a magnetic force, the rotation axis 2100 of the roller 2300 from sagging due to gravity. The size of the magnetic unit 2400 or the strength of a magnetic force may be adjustable depending on the length, material, etc. of the rotation axis 2100. In another embodiment, the magnetic unit 2400 may be electromagnet, and the control unit 1500 may control a magnetic strength of the magnetic unit 2400.

When the polarizing film is peeled from the panel, the shape of the inclined surface 2220 of the fixing unit 2200 and the roller 2300 being in direct contact with the polarizing film has effect on fracture of the polarizing film. The reason is that the polarizing film being peeled is moved while keeping in contact with the roller 2300 and the inclined surface 2220. In this embodiment, the radius of the roller 2300 and the inclined angle (θ) are adjusted to minimize the fracture of the polarizing film. For this, the radius of the roller 2300 is formed to range from 4 mm to 30 mm, preferably, at 5 mm. Also, the inclined angle (θ) is formed to range from 20 degrees to 40 degrees, preferably, 30 degrees.

Figure 13:
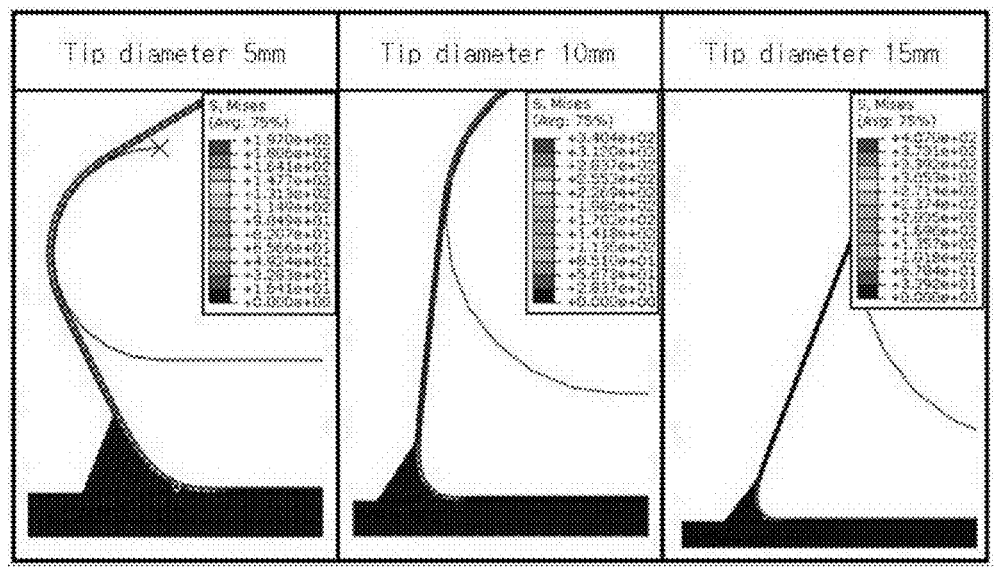
FIG. 13 is a diagram showing results of analyzing variations in stress of a peeling surface depending on variations in diameter of a roller in case a peeling load is 9.81 N/mm.

As shown in FIGS. 12 and 13, when a peeling load is unchanged, a smaller tip diameter of the roller 2300 reduces stress occurring at the peeling surface, so that the fracture of the polarizing film can be minimized in a peeling process. The reason that a smaller tip diameter of the roller 2300 reduces stress occurring at the peeling surface is that a smaller tip diameter of the roller 2300 facilitates the deformation of the polarizing film even in an unchanged load and thus allows the polarizing film to be bent easily in a peeling direction, and also that a smaller tip diameter of the roller 2300 reduces a distance between the roller 2300 and the peeling surface, increases a restoring force of the bent polarizing film, and thus causes a reduction in stress. Like this, the fracture of the polarizing film can be prevented in a peeling process as the tip diameter (or radius) of the roller 2300 is reduced. However, an excessively small diameter of the roller 2300, such as a tip diameter of 5 mm at a peeling load of 16.35 N/mm, may invite any damage at the roller 2300. Therefore, the diameter of the roller 2300 should be reduced within the limits of causing no damage of the roller 2300. In this embodiment, it is desirable that the diameter of the roller 2300 is 10 mm (i.e., a radius of 5 mm).

In another embodiment, a low-frictional pad may be attached to the inclined surface 2220. The low-frictional pad attached to the inclined surface 2220 is in contact with the polarizing film being peeled. The low-frictional pad is formed of material having a low coefficient of friction in order to reduce a frictional force applied to the polarizing film and hence prevent the fracture of the polarizing film in a peeling process. In still another embodiment, the inclined surface 2220 may be coated with fluorine to reduce a frictional force.

Figure 14:
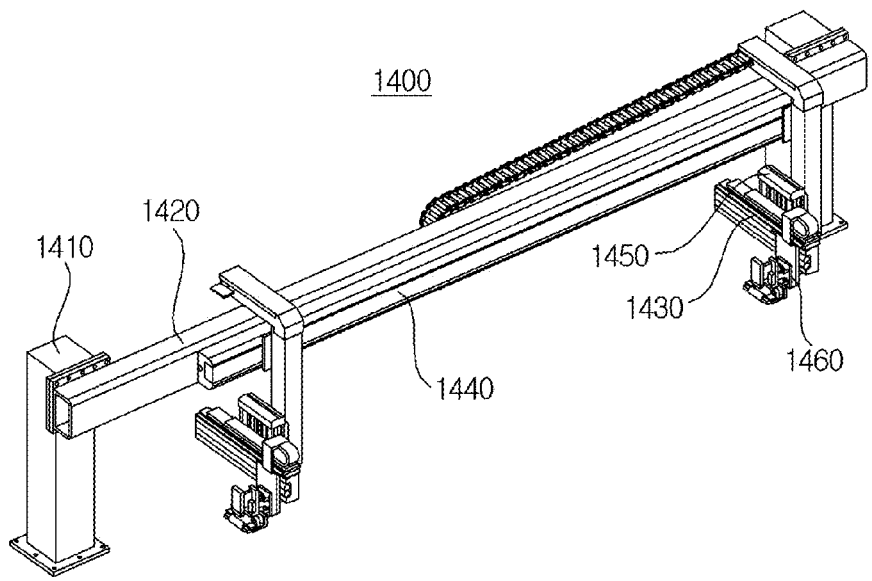
FIG. 14 is a perspective view illustrating a clamping assembly of a peeling apparatus in accordance with an embodiment of the present invention.
Figures 15, 16:
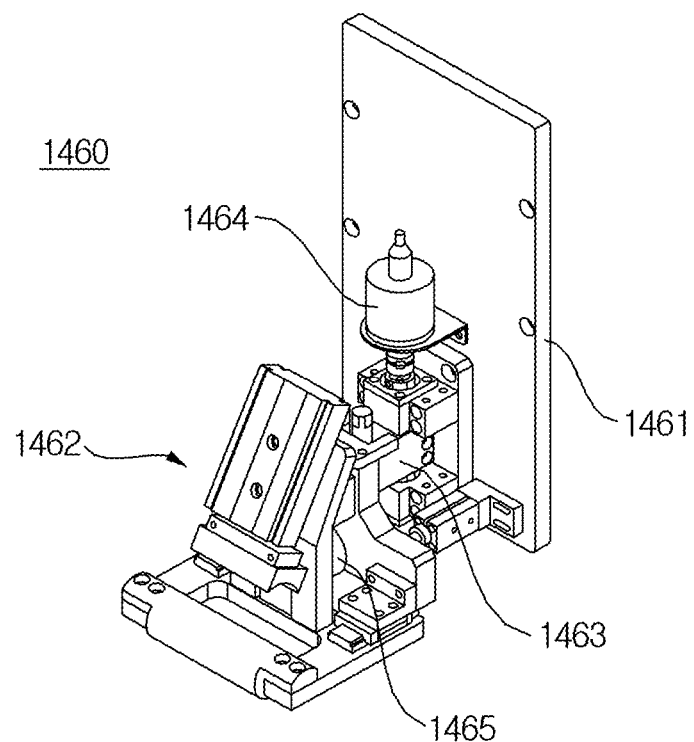
FIG. 15 is a perspective view illustrating a clamping unit of a clamping assembly in accordance with an embodiment of the present invention.
FIG. 16 is a table showing variations in the maximum stress depending on a peeling load.
Figure 17:
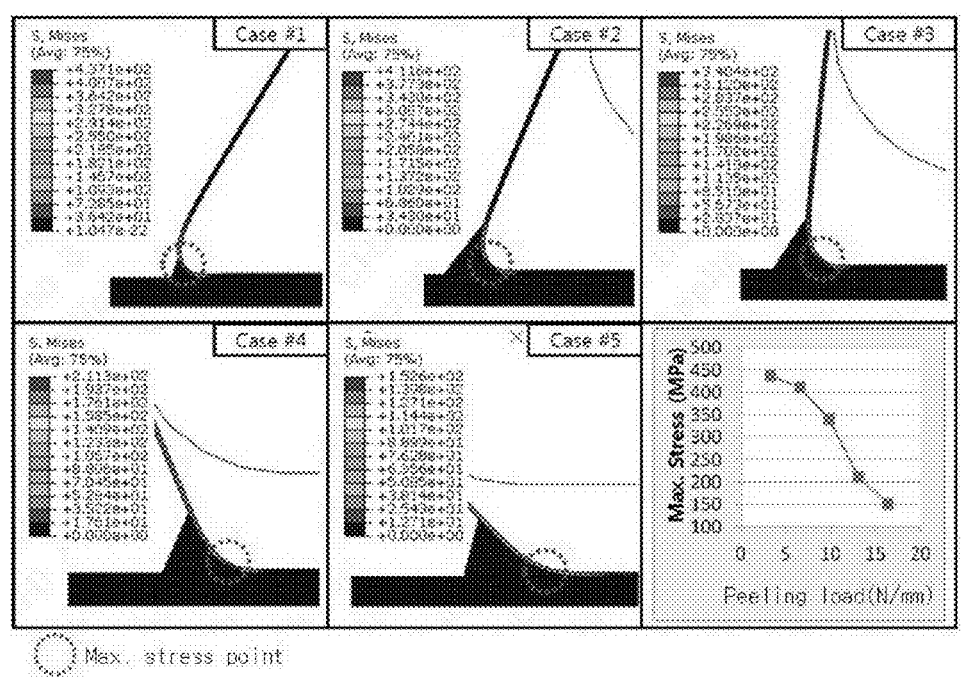
FIG. 17 is a diagram showing results of analyzing variations in the maximum stress depending on a peeling load.
Figure 18:
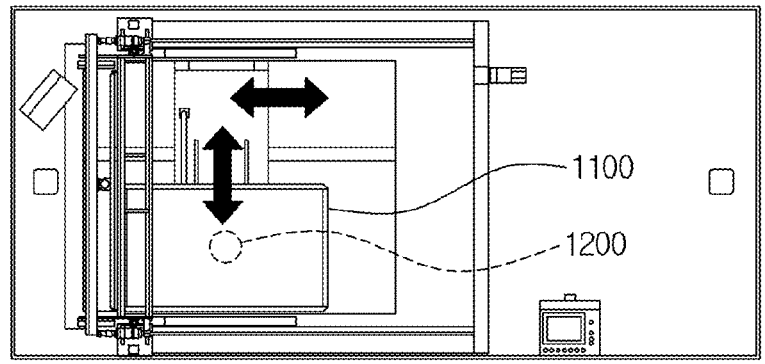
FIG. 18 is a diagram illustrating a motion of a stage in accordance with an embodiment of the present invention.
Figure 18:
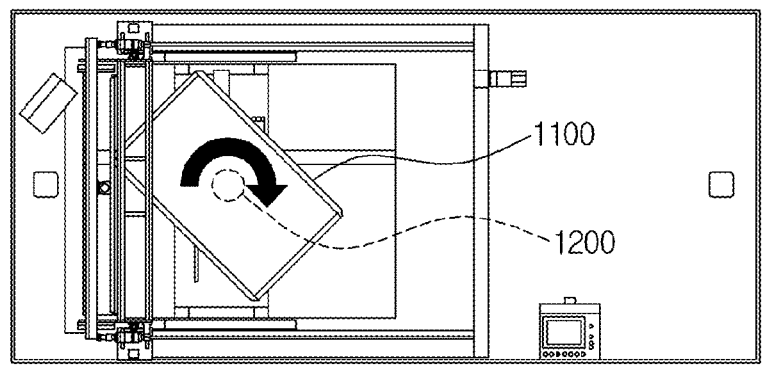

FIG. 14 is a perspective view illustrating a clamping assembly of a peeling apparatus in accordance with an embodiment of the present invention. FIG. 15 is a perspective view illustrating a clamping unit of a clamping assembly in accordance with an embodiment of the present invention. FIG. 16 is a table showing variations in the maximum stress depending on a peeling load. FIG. 17 is a diagram showing results of analyzing variations in the maximum stress depending on a peeling load. FIG. 18 is a diagram illustrating a motion of a stage in accordance with an embodiment of the present invention.

As shown in FIGS. 14 to 18, the clamping assembly 1400 includes a fixing axis 1410, a fixing bar 1420, an X-axis transfer unit 1430, a Y-axis transfer unit 1440, a Z-axis transfer unit 1450, and a clamping unit 1460.

The fixing bar 1420 is extended in the Y-axis direction. The fixing axis 1410 supports the fixing bar 1420 such that the fixing bar 1420 is fixed at a predetermined height at both ends thereof.

The clamping unit 1460 is mounted on the X-axis transfer unit 1430, which is mounted on the Z-axis transfer unit 1450. Also, the Z-axis transfer unit 1450 is mounted on the Y-axis transfer unit 1440, which is mounted on the fixing bar 1420. The Y-axis transfer unit 1440 transfers the Z-axis transfer unit 1450 in the Y-axis direction, the Z-axis transfer unit 1450 transfers the X-axis transfer unit 1430 in the Z-axis direction, and the X-axis transfer unit 1430 transfers the clamping unit 1460 in the X-axis direction. Therefore, the X-axis transfer unit 1430, the Y-axis transfer unit 1440 and the Z-axis transfer unit 1450 can transfer the clamping unit 1460 in the X-axis, Y-axis and Z-axis directions as needed.

The clamping unit 1460 has a fixing member 1461, a clamper 1462, a joint member 1463, a rotation sensor 1464, and a tension sensor 1465. The clamping unit 1460 is fixed to the X-axis transfer unit 1430 through the fixing member 1461. The clamper 1462 clamps a part of the peeled polarizing film. For this, the clamper 1462 may have a supporting member and a cylinder. The clamper 1462 may adjust a peeling load applied to the polarizing film by regulating a pressure applied to the cylinder. As shown in FIGS. 16 and 17, when a peeling load increases, bending of the polarizing film decreases at the peeling surface. Therefore, stress is reduced and peeling performance is improved. However, if a peeling load exceeds a critical value, the maximum stress may be generated at the roller 2300 and thereby a possibility that the roller 2300 will be damaged is increased. Accordingly, for effective peeling, it is required to increase a peeling load without damage of the roller 2300.

The joint member 1463 allows the clamper 1462 to rotate on the Z-axis within a certain range, using a rotating force outputted from a servo motor or the like. Although it is described in this embodiment that the clamper 1462 rotates on the Z-axis, any other rotation on the other axis or plural axes can be possible.

The rotation sensor 1464 detects a rotation angle of the clamper 1462. In this embodiment, the rotation sensor 1464 may be, but not limited to, a rotary encoder or a potential meter. The tension sensor 1465 can detect tension applied to the polarizing film. The tension sensor 1465 may be a load cell.

When any tension occurs at the polarizing film being peeled, the clamper 1462 rotates in a certain direction by means of tension. At this time, information about tension and rotation angle detected by the rotation sensor 1464 and the tension sensor 1465 is offered to the controller 1500. Therefore, the controller 1500 can recognize tension and a resultant rotation angle of the clamper 1462 and thereby control the rotation of at least one of the stage 1100, the clamper 1462 and the peeling bar 1314 to maintain uniform tension of the polarizing film being peeled. Namely, by controlling at least one of the stage 1100, the clamper 1462 and the peeling bar 1314, no stress concentration occurs and thus tension can be uniformly applied to the entire polarizing film. For this, it is possible to allow both ends of the polarizing film to be very close to the peeling bar. In order to minimize the fracture of the polarizing film in a peeling process, it is required to make both ends of the polarizing film be very close to the peeling bar at a peeling position. Namely, if any end of the polarizing film gets loose or moves while a peeling process is performed, a possibility of fracture is increased. In this embodiment, by controlling at least one of the stage 1100, the clamper 1462 and the peeling bar 1314 to rotate, both ends of the polarizing film can be very close to the peeling bar 1314 and also the fracture of the polarizing film can be prevented in a peeling process.

In an embodiment, the stage 1100 has various motions. As shown in part (a) of FIG. 18, the stage 1100 can move linearly in X-axis and Y-axis directions under the control of the stage conveying assembly 1200. In an embodiment, a peeling process for peeling the polarizing film from the panel may be performed through the movement of the stage 1100. Additionally, the movement of the stage 1100 allows both ends of the polarizing film to be very close to the peeling bar 1314.

As shown in part (b) of FIG. 18, the stage 1100 can rotate as well as move linearly. Such rotation of the stage 1100 can be made in two types. In an embodiment, the controller 1500 may actively rotate the stage 1100 by controlling the stage conveying assembly 1200. Namely, the stage 1100 is mounted to the stage conveying assembly 1200 through a driving axis and is rotated by the rotation of the driving axis. This makes it possible to actively control the rotation of the stage 1100 in a peeling process, so that tension can be adjusted at both widthwise ends of the polarizing film by means of control. It is therefore possible to make both widthwise ends of the polarizing film be very close to the peeling bar at a peeling position.

In another embodiment, the stage 1100 is mounted to the stage conveying assembly 1200 so as to be freely rotated. Namely, when any external force is applied to the stage 1100, the stage 1100 may rotate freely. In this case, an external force (i.e., tension) applied to the polarizing film is delivered to the stage 1100, and a free rotation of the stage 1100 allows tension to be applied uniformly to the entire polarizing film. Therefore, the fracture of the polarizing film can be prevented in a peeling process.

Figure 19:
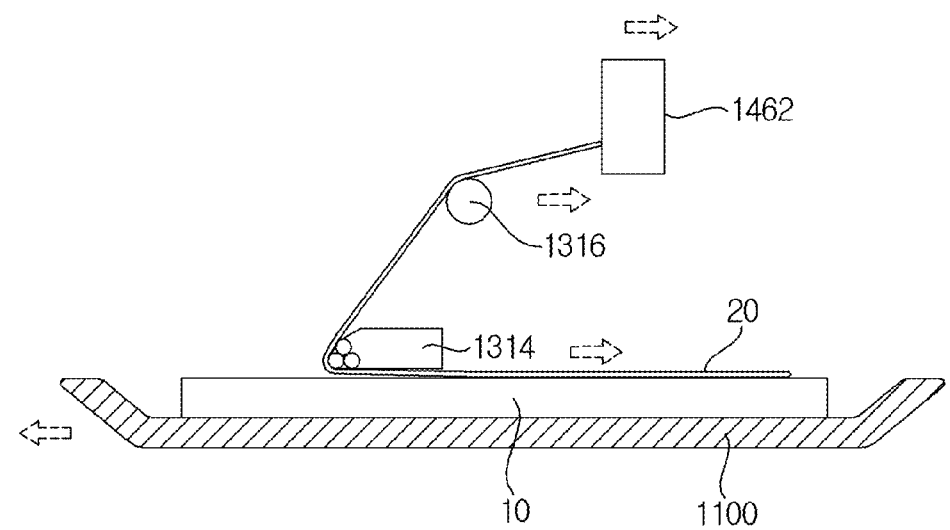
FIG. 19 is a concept view illustrating a peeling method in accordance with an embodiment of the present invention.
Figure 20:
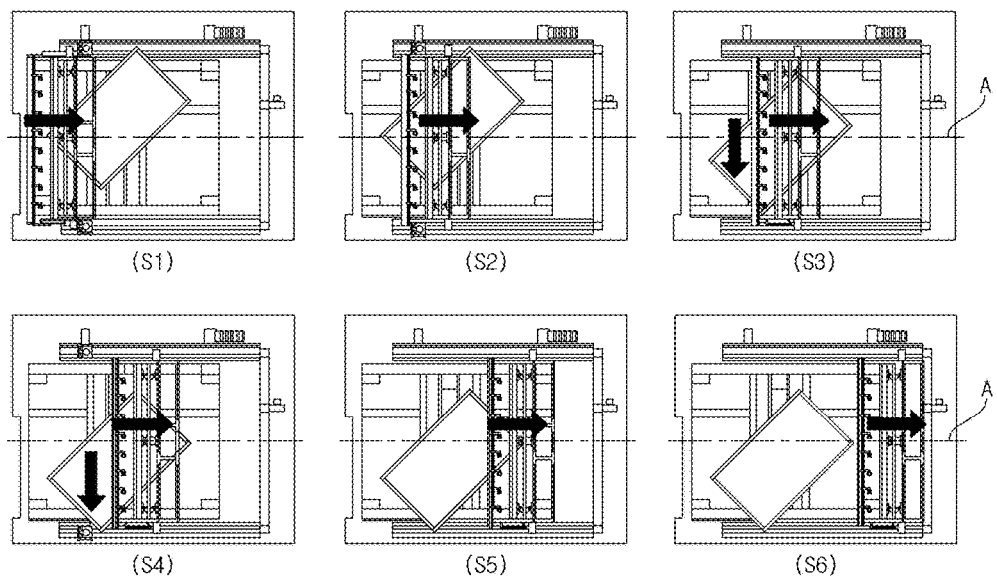
FIG. 20 is a concept view illustrating a motion of a peeling apparatus implementing a peeling method in accordance with an embodiment of the present invention.
Figure 21:
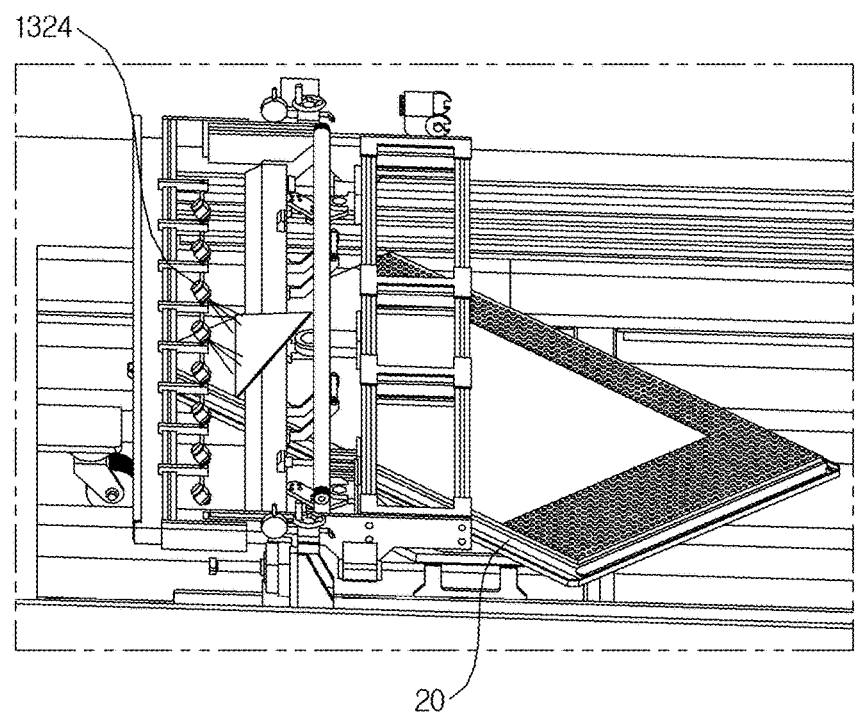
FIG. 21 is a diagram illustrating a spraying action of a peeling accelerant in a peeling method in accordance with an embodiment of the present invention.
Figure 22:
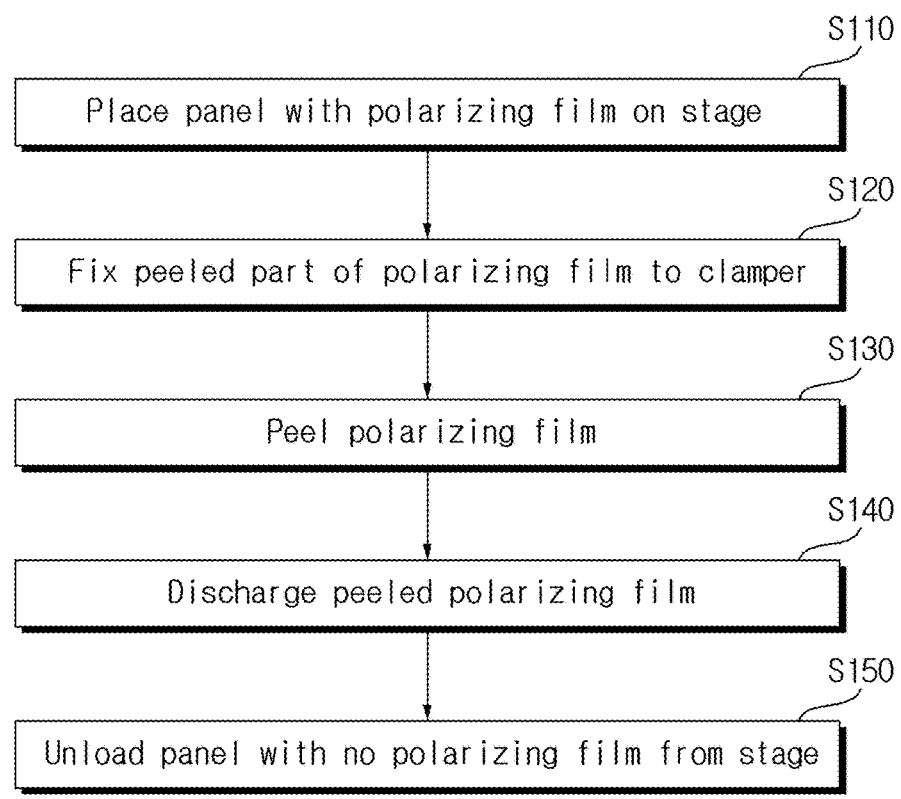
FIG. 22 is a flow diagram illustrating a method for peeling a polarizing film from a panel in accordance with an embodiment of the present invention.

Now, a peeling method according to an embodiment of the present invention will be described. FIG. 19 is a concept view illustrating a peeling method in accordance with an embodiment of the present invention. FIG. 20 is a concept view illustrating a motion of a peeling apparatus implementing a peeling method in accordance with an embodiment of the present invention. FIG. 21 is a diagram illustrating a spraying action of a peeling accelerant in a peeling method in accordance with an embodiment of the present invention. FIG. 22 is a flow diagram illustrating a method for peeling a polarizing film from a panel in accordance with an embodiment of the present invention.

As shown in FIGS. 19 to 22, in order to peel the polarizing film from the panel in the peeling method according to an embodiment, the panel 10 to which the polarizing film 20 is attached is placed on the stage 1100 (S110). After the panel 10 is placed on the stage 1100, the stage 1100 is moved to a clamping position. In another embodiment, the clamper 1462 may be moved instead of the stage 1100. In still another embodiment, both the stage 1100 and the clamper 1462 may be moved together.

When the stage 1100 is moved to the clamping position, a part of the polarizing film 20 attached to the panel 10 is peeled and fixed to the clamper 1462 of the clamping unit (S120). In order to peel a part of the polarizing film 20, the panel 10 may be heated. At this time, since the stage 1100 can deliver heat uniformly to the entire panel 10 through a plurality of flat-type heaters, no fracture occurs at the polarizing film 20 in a peeling process. Additionally, as shown in FIG. 19, when fixing a part of the polarizing film 20 to the clamper 1462, the peeled polarizing film 20 keeps in contact with the roller of the peeling bar 1314. Namely, the peeled polarizing film 20 is fixed to the clamper 1462, keeping in contact with the roller of the peeling bar 1314 and the rotating bar 1316. It is therefore possible to prevent the peeled polarizing film 20 from being bent steeply and thus to prevent the fracture of the polarizing film in a peeling process.

When a part of the polarizing film 20 is fixed to the clamper 1462, a peeling process for the polarizing film 20 is performed (S130). This process accompanies the movement of at least one of the stage 1100 and the clamper 1462. In order to peel the polarizing film 20, the panel 10 may be heated uniformly through a plurality of flat-type heaters and thus the fracture of the polarizing film 20 is prevented during the peeling process. Additionally, the cylinder of the clamper 1462 can adjust a peeling load applied to the polarizing film 20 in the peeling process by regulating a pressure applied thereto.

While the polarizing film 20 is peeled, at least one of the stage 1100 and the clamper 1462 may be moved such that both ends of the polarizing film 20 can be very close to the peeling bar 1314 and also such that uniform tension can be applied to the peeled polarizing film 20. Namely, one or both of the stage 1100 and the clamper 1462 may be moved. Therefore, both ends of the polarizing film 20 closely adhere to the peeling bar 1314, so that the polarizing film 20 can be peeled stably without fracture.

Additionally, in this embodiment, at least one of the stage 1100, the peeling bar 1314 and the clamper 1462 may be rotated in the peeling process such that the peeled polarizing film 20 can have uniform tension in a widthwise direction. The controller can detect tension applied to the polarizing film and a rotation angle through the tension sensor and the rotation sensor of the clamping unit, the rotation sensor connected with the joint member of the peeling unit, and the like. Based on such sensing values, the controller can rotate at least one of the stage 1100, the peeling bar 1314 and the clamper 1462 so as to obtain uniform tension.

In another embodiment, the stage 1100 may be installed to be freely rotated by any external force, so that the stage 1100 can be rotated by tension applied to the peeled polarizing film 20. In this case, without any control of the controller, the stage 1100 may rotate in any direction for equalizing tension applied to the polarizing film 20 in a widthwise direction. Namely, if tension applied widthwise to the polarizing film 20 is not uniform, the stage 1100 may be rotated freely in a direction for uniform tension.

In this embodiment, as shown in FIG. 21, the peeling accelerant may be sprayed to the peeling position during the peeling process. The peeling accelerant may be water, and the sprayed peeling accelerant removes clearly adhesive. The peeling accelerant may be jetted through the sprays.

When the polarizing film 20 is completely peeled, the peeled polarizing film 20 is discharged (S140). Then the controller moves the stage 1100 to a position for unloading the panel 10.

When the stage 1100 is moved to a given position, the panel 10 is unloaded from the stage 1100 (S150). Thereafter, in order to peel another polarizing film from another panel, the stage 1100 is moved to a position for placing the panel.

The method for peeling the polarizing film from the panel by the controller in accordance with the present invention may be implemented in a software form being readable through various computing manners and recorded in a computer-readable storage medium. The storage medium may contain a program command, a data file, a data structure, etc. separately or in combination. The program command recorded in the storage medium may be specially designed for this invention or well known to those skilled in the computer software industry. For example, the storage medium may include magnetic media such as a hard disk, a floppy disk, and a magnetic tape, optical media such as a Compact Disc Read Only Memory (CD-ROM) and a Digital Versatile Disc (DVD), magneto-optical media such as a floptical disk, and hardware devices specially configured to store and perform a program instruction, such as a Read Only Memory (ROM), a Random Access Memory (RAM), a flash memory and the like. Such program instructions may include high class language codes, which can be executed in a computer by using an interpreter, as well as machine codes made by a compiler. The aforementioned hardware device may be configured to operate as one or more software modules in order to perform the operation of various embodiments of the present disclosure, and vice versa.

While this invention has been particularly shown and described with reference to an exemplary embodiment thereof, it will be understood by those skilled in the art that various changes in form and details may be made therein without departing from the spirit and scope of this invention as defined by the appended claims.

INDUSTRIAL APPLICABILITY

The present invention relates to a peeling bar, apparatus, and method for peeling a polarizing film from a panel. This invention may minimize friction between the peeling bar and the polarizing film since the peeled polarizing film is in contact with a roller of the peeling bar. It is therefore possible to prevent the fracture of the polarizing film when the polarizing film is detached.

This invention may be used at the manufacture of a panel of an image display device and also can stably peel the polarizing film from the panel without the fracture of the polarizing film due to non-uniform tension applied to the polarizing film.

The invention claimed is:
1. A peeling bar for peeling a polarizing film from a panel, the peeling bar comprising:
a guide unit;
a fixing unit combined with a front part of the guide unit;
a roller installed rotatably on the fixing unit and configured to come in direct contact with the polarizing film and configured to prevent fracture of the polarizing film being peeled, the roller having a radius ranging from 4 mm to 30 mm; and a magnetic unit mounted apart from the roller and configured to prevent a rotation axis of the roller from sagging, wherein the fixing unit includes an inclined surface configured to connect an upper part of the roller with the guide unit, and an inclined angle of the inclined surface is in a range from 20 degrees to 40 degrees.

2. The peeling bar of claim 1, wherein the roller is combined with the fixing unit through a bearing and a washer.

3. A peeling apparatus for peeling a polarizing film from a panel, the peeling apparatus comprising:

a stage configured to place thereon the panel having the polarizing film attached thereto;

a clamper configured to clamp a part of the polarizing film peeled from the panel;

a peeling bar set forth in claim 1, wherein the peeling bar is configured to be moved on the polarizing film being peeled; and a controller configured to move at least one of the stage and the clamper to peel the polarizing film such that tension is uniformly applied to the polarizing film by preventing stress concentration at a peeling position of the polarizing film.

4. The peeling apparatus of claim 3, wherein the controller is further configured to rotate at least one of the stage, the peeling bar and the clamper and thereby to make both widthwise ends of the peeled polarizing film closely adhere to the peeling bar such that tension is applied uniformly to the polarizing film at the peeling position.

5. The peeling apparatus of claim 3, wherein the stage is installed to be freely rotated by an external force, and wherein the stage is rotated by tension applied to the polarizing film, and thereby both ends of the peeled polarizing film closely adhere to the peeling bar such that tension is applied uniformly to the polarizing film at the peeling position.

6. The peeling apparatus of claim 3, wherein the controller is further configured to move at least one of the stage and the clamper and thereby to make both ends of the peeled polarizing film closely adhere to the peeling bar such that tension is applied uniformly to the polarizing film at the peeling position.

7. The peeling apparatus of claim 3, further comprising:
an accelerant spray unit configured to spray a peeling accelerant to the peeling position.

8. The peeling apparatus of claim 7, wherein the stage includes an accelerant storage configured to prevent the peeling accelerant from seeping.

9. The peeling apparatus of claim 3, wherein the stage includes a plurality of flat-type heaters configured to apply heat uniformly to an entire surface thereof.

10. The peeling apparatus of claim 3, wherein the peeling bar is adjustable in height.

11. The peeling apparatus of claim 3, wherein the clamper is configured to adjust a peeling load applied to the polarizing film in a peeling process.

12. A peeling method for peeling a polarizing film from a panel, the peeling method comprising steps of:

placing on a stage the panel having the polarizing film attached thereto;

fixing a part of a peeled polarizing film to a clamper after the part of the polarizing film is peeled from the panel, wherein a peeling bar of claim 1 is located at a peeling position, and wherein the peeled polarizing film is in contact with a roller of the peeling bar; and peeling the polarizing film by moving at least one of the clamper and the stage.

13. The peeling method of claim 12, wherein the peeling step includes rotating at least one of the stage, the peeling bar and the clamper, and thereby making both ends of the peeled polarizing film closely adhere to the peeling bar such that tension is applied uniformly to the polarizing film at the peeling position.

14. The peeling method of claim 12, wherein the peeling step includes, when the stage is installed to be freely rotated by an external force, allowing the stage to be rotated by tension applied to the polarizing film, and thereby allowing both ends of the peeled polarizing film to closely adhere to the peeling bar such that tension is applied uniformly to the polarizing film at the peeling position.

15. The peeling method of claim 12, wherein the peeling step includes moving at least one of the stage and the clamper, and thereby making both ends of the peeled polarizing film closely adhere to the peeling bar such that tension is applied uniformly to the polarizing film at the peeling position.

16. The peeling method of claim 12, wherein the peeling step includes spraying a peeling accelerant to the peeling position.

17. The peeling method of claim 12, wherein at least one of the fixing step and the peeling step includes applying heat to the panel through a plurality of flat-type heaters installed to apply heat uniformly to an entire surface of the stage.

* * * * *